Nov. 3, 1970 T. G. WRIGHT, JR., ET AL 3,538,257

EVENT-RESPONSIVE TELEPHONE SIGNAL DEVICE

Filed Oct. 31, 1967

INVENTOR.

BY Newton, Hopkins, Jones & Ormsby

United States Patent Office 3,538,257

Patented Nov. 3, 1970

3,538,257

EVENT-RESPONSIVE TELEPHONE SIGNAL DEVICE

Thomas G. Wright, Jr., 40 Peachtree Valley Road, Apt. H–7, Atlanta, Ga. 30309; Robert D. Trammell, Jr., Rte. 1, Box 90, Suwanee, Ga. 30174; and Cyril F. Bell III, 300 Chester St., Marietta, Ga. 30060

Filed Oct. 31, 1967, Ser. No. 679,324
Int. Cl. H04m *11/04*
U.S. Cl. 179—5 8 Claims

ABSTRACT OF THE DISCLOSURE

What is disclosed herein is a signal device for providing a message at a telephone located at a particular location in response to the occurrence of an event at a location remote from the particular location. As disclosed herein, the signal device includes a conventional tape recorder, an input unit by which programmed series of pulses and a verbal message are recorded on the magentic tape of the tape recorder, and an output unit by which the programmed series of pulses and the verbal message on the magnetic tape of the tape recorder are fed to a convention telephone coupler to pulse a telephone circuit for the number of a particular telephone and to provide the verbal message at the particular telephone. The input unit includes an oscillator and a mixer for selectively providing the output of the oscillator or the output of a microphone to the recording jack of the tape recorder. The output unit includes a pulse generator responsive to voltage pulses in the circuit of the audio amplier in the tape recorder when the amplifier is overdriven and a matching unit for matching the output impedance of the audio amplifier in the tape recorder to the input impedance of the telephone coupler.

BACKGROUND OF THE INVENTION

Field of the invention

The invention disclosed herein relates to signal devices and more particularly to a signal device for selectively providing a message at one or more telephones located remote from the location at which an event such as a fire or burglary occurs.

Prior art

There is a continuing and growing need for signal devices which are responsive to the occurrance of an event such as a fire or burglary at a particular location and which will deliver one or more messages at locations remote from the particular location. Various signal devices have been used in the prior art to meet this requirement but their use has been limited because these prior art signal devices have been relatively expensive to operate or relatively expensive in initial cost.

These prior art signal devices have been relatively expensive to operate because they have frequently required communication circuits for their exclusive use between the particular location of a possible fire, burglary or similar event and the one or more remote locations at which it is desired to deliver a message concerning the occurrence of such an event. Attempts to avoid relatively high operating expense by use of conventional telephone circuits on an as needed basis have resulted in prior art signal devices being relatively expensive in initial cost because of the elaborate circuitry used to seize and pulse the telephone circuits.

SUMMARY OF THE INVENTION

The invention disclosed herein avoids these and other difficulties encountered with prior art signal devices in that it combines a conventional and relatively inexpensive tape recorder with a simple input unit and a simple output unit to provide a tape recorder which uses conventional telephone circuits on an as-needed basis for delivering one or more verbal messages at one or more telephones in response to the occurrence of an event such as a fire or burglary. The input unit includes a mixer for selectively providing the output from an oscillator or a verbal message to the recording jack of the tape recorder and the output unit includes a pulse generator responsive to voltage pulses in the circuit of the audio amplifier in the tape recorder and a matching unit for matching the output impedance of the audio amplifier in the tape recorder to the input impedance of a telephone coupler.

One or more programmed series of pulses and one or more verbal messages are recorded on the magnetic tape of the tape recorder using the input unit. Upon subsequent actuation of the playing control of the tape recorder and by using the output unit, each programmed series of pulses serves through a telephone coupler to seize and pulse a telephone circuit for reaching a particular telephone to which a verbal message is delivered. A disconnect pulse on the magnetic tape serves through the output unit and the telephone coupler to disconnect the signal device fro meach telephone so that a plurality of separate telephones may be reached in sequence for delivery of a verbal message. Thus, the signal device disclosed herein is a highly flexible and useful signal device while at the same time being relatively inexpensive to manufacture, use, and maintain.

BRIEF DESCRIPTION OF THE DRAWING

These and other features and advantages of the invention will be more clearly understood from the following detailed description and the accompanying drawing in which like characters of reference designate corresponding parts throughout and in which.

BRIEF DESCRIPTION OF AN EMBODIMENT

Figure 1:
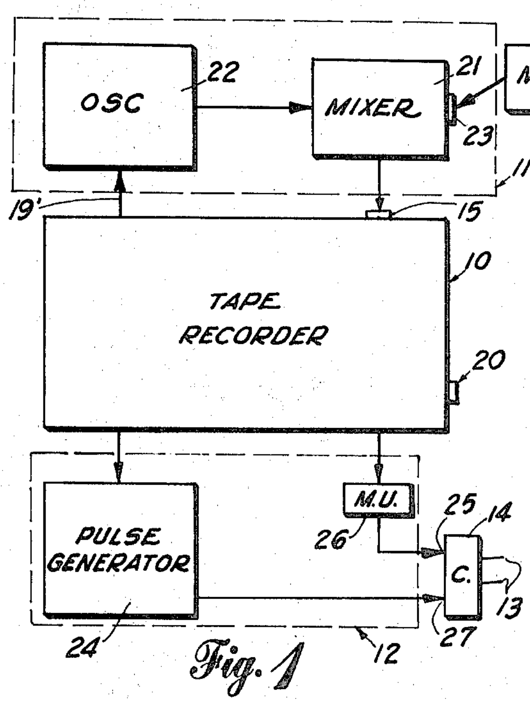
FIG. 1 is a block diagram of an embodiment of the signal device disclosed herein.

The foregoing described figures and the following detailed description disclose a specific embodiment of the invention. However, it will be understood that the invention may be embodied in other equivalent forms.

The invention disclosed herein is most easily understood as a signal device which includes a conventional tape recorder 10 in combination with an input unit 11 and an output unit 12. The input unit 11 serves as an input means for recording pulses and verbal messages on a magnetic tape in the tape recorder 10 and the output unit 12 serves as an output means for providing pulses and verbal messages from the tape recorder 10 to a conventional telephone circuit 13 through a conventional telephone coupler 14. The tape recorder 10 may be any conventional tape recorder having a recording jack 15 by which input from a microphone 16 is provided, an audio amplifier 17, an audio output transformer 18, a power supply 19, and a playing control switch 20. This is because the input unit 11 and output unit 12 of the invention disclosed herein will provide a signal device embodying the invention when used with most conventional tape recorders 10.

This is most easily seen from FIG. 1 from which it will be seen that the input unit 11 includes a mixer 21 having an output which is fed to the recording jack 15 of the tape recorder 10 and an oscillator 22 which provides a tone input to a mixer 21 in a frequency range of from 800 to 8000 cycles per second. Most conveniently, the oscillator 22 is driven by the power supply 19 of the tape recorder 10 as indicated at 19'.

The mixer 21 serves to provide the output from the oscillator 22 or from the microphone 16 as the input to the recording jack 15. The microphone 16 is connected to the input terminal 23 of the mixer 21 in the same manner as it is conventionally connected to the recording jack 15.

As also seen from FIG. 1, the output unit 12 includes a pulse generator 24 which is responsive to voltage pulses in the circuit of the audio amplifier 17 in the tape recorder 10 so as to provide a programmed series of pulses to the pulsing terminals 25 of the telephone coupler 14. The output unit 12 also includes a matching unit 26 by which the output impedance of the audio output transformer 18 is matched to the input impedance at the message terminals 27 of the telephone coupler 14.

From the foregoing general description of an embodiment of the invention as schematically shown in FIG. 1, it will now be understood that the input unit 11 of a signal device embodying the invention disclosed provides an input means by which pulses and messages are selectively recorded by a conventional tape recorder 10. Similarly, it will now be understood that the output unit 12 provides an output means by which pulses and messages recorded on the magnetic tape of a conventional tape recorder 10 are delivered to a conventional telephone coupler 14. This will be better understood from a consideration of FIG. 2 and FIG. 3.

Figure 2:
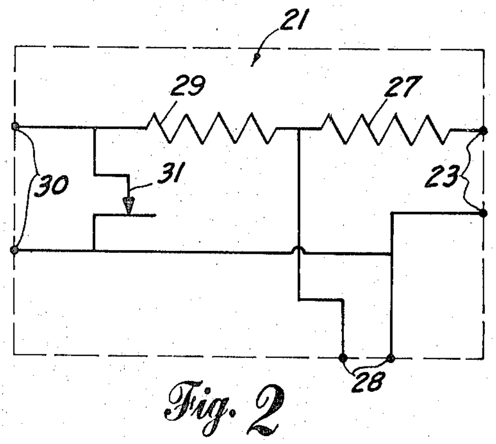
FIG. 2 is a circuit diagram of the mixer in an embodiment of the invention disclosed herein.

FIG. 2 is a circuit diagram of a circuit suitable for the mixer 21 and from FIG. 2 it will be seen that input terminal 23 to which the microphone 16 is connected is, in turn, connected through a resistor 27 to an output terminal 28. The output terminal 28 of the mixer 21 is also connected through a resistor 29 to an oscillator terminal 30. It is the output terminal 28 which is connected in conventional manner to the recording jack 15 of the tape recorder 10 as schematically indicated in FIG. 1.

The oscillator terminal 30 is the terminal to which the output of a conventional oscillator 22 is connected and as already indicated above, the oscillator 22 may be driven from the power supply 19 of the tape recorder 10 or by any other conventional power source. From FIG. 2 it will be seen that the mixer 21 includes a switch 31 positioned to short the oscillator terminal 30 and that with the switch 31 closed, the input at the oscillator terminal 30 does not reach the output terminal 28. In addition, it will be seen from FIG. 2 that when the switch 31 is open, the resistor 27 substantially prevents the input at the oscillator terminal 30 from reaching the input terminal 23 and a microphone 16 connected to the input terminal 23. Moreover, when the switch 31 is closed, the resistors 27 and 29 prevent input from a microphone 16 at the input terminal 23 from being shorted by the switch 31.

It will now be understood from FIG. 2 that when the switch 31 is closed, the input from the microphone 16 passes through the mixer 21 to the recording jack 15 of the tape recorder 10 to provide for the recording of a verbal message on the magnetic tape (not shown) in the tape recorder 10 as the message is spoken into the microphone 16. Similarly, it will be understood that opening the switch 31 causes a pulse from the oscillator 22 to pass through the mixer 21 to the recording jack 15 for the recording of the pulse on the magnetic tape in the tape recorder 10. The length of each pulse and the intervals between successive pulses are determined by the operation of the switch 31 and for providing a programmed series of pulses for subsequently pulsing a telephone circuit 13, the switch 31 is conveniently provided by a conventional telephone dialing unit (not shown).

Figure 3:
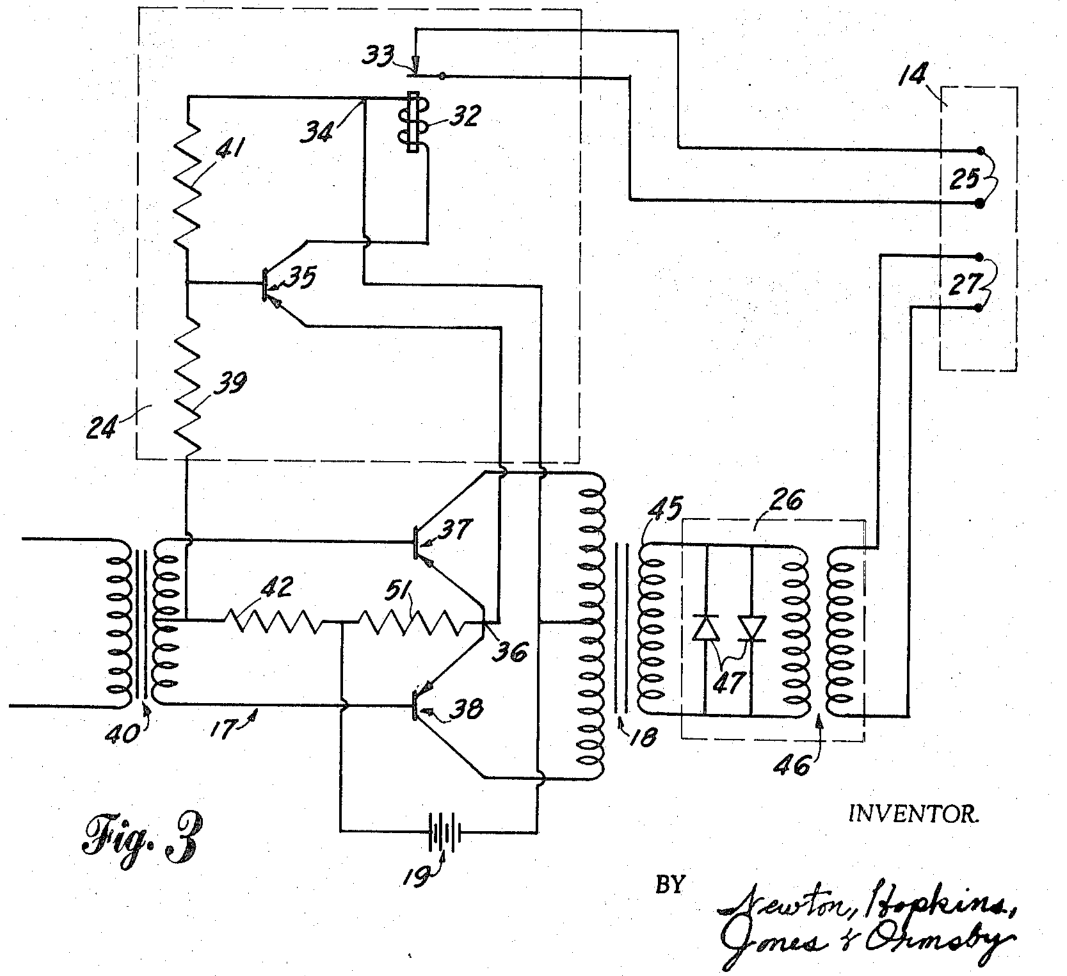
FIG. 3 is a circuit diagram showing the audio amplifier in a tape recorder with the pulse generator and matching unit of an embodiment of the invention disclosed herein.

FIG. 3 is a circuit diagram of a circuit suitable for the pulse generator 24 and the matching unit 26. From FIG. 3 it will be seen that the pulse generator 24 includes a relay coil 32 having normally closed contacts 33. The contacts 33 are connected to the pulsing terminals 25 of the telephone coupler 14 so that, as the contacts 33 are opened and closed, conditions similar to those required in dialing a telephone are provided at the telephone coupler 14.

The relay coil 32 has one side connected through the point 34 to a positive voltage terminal in the power supply 19 of the tape recorder 10. The other side of the coil 32 is connected through the emitter-collector circuit of a transistor 35 to the common connection 36 of emitters of two transistors 37 and 38 arranged so that the audio amplifier 17 of the tape recorder 10 is a push-pull amplifier. Since the emitters of the transistors 37 and 38 in the audio amplifier 17 are connected to a negative voltage terminal in the power supply 17 through a resistor 51, a complete circuit is provided through the power supply 17, the emitter-collector circuit of the transistor 35, and the relay coil 32.

The base of the transistor 35 is connected through a resistor 39 to the center tap of the secondary winding of the input audio transformer 40, and through a resistor 41 to the point 34. The center tap of the secondary winding of the input audio transformer 40 is also connected through a thermal resistor 42 to the negative voltage terminal of the power supply 19.

The resistors 39, 41, and 42 are selected so that the bias on the base of the transistor 35 from the power supply 19 causes current flow in the emitter-collector circuit of the transistor 35. Thus, the coil 32 is energized when the audio amplifier 17 is energized and serves to open the contacts 33 and provide a condition at the telephone coupler 14 which seizes the telephone circuit 13.

In recording pulses on a magnetic tape with the input unit 11, the amplitude of the pulses is maintained at a level which results in the audio amplifier 17 being overdriven when the pulses are subsequently fed into the audio amplifier 17 from the magnetic tape in the tape recorder 10. However, the audio amplifier 17 operates normally when a recorded message is fed into the audio amplifier 17 from the magnetic tape.

Those skilled in the art will understand that when the audio amplifier 17 is overdriven by a pulse, there is an increase in power which results in increased current flow through the thermal resistor 42. This increased current flow causes the resistance of the resistor 42 to increase and as the resistance of the resistor 42 increases, the bias on the base of the transistor 35 is decreased sufficiently to cause the emitter-collector circuit of the transistor 35 not to conduct. This, in turn, de-energizes the coil 32 and causes the contacts 33 to close and remain closed as long as the audio amplifier 17 is overdriven.

Thus, the contacts 33 are closed in response to each pulse recorded on the magnetic tape and remain closed for the duration of each pulse. As a result, a programmed series of pulses on the magnetic tape cause opening and closing of the contacts 33 to provide through the telephone coupler 14 those voltage pulses in the telephone circuit 13 which correspond to the voltage pulses from a conventional telephone instrument when used to dial a telephone number.

It will be understood that verbal messages are recorded on the magnetic tape in the tape recorder 10 at normal levels of amplitude and do not cause overdriving of the audio amplifier 17 or closing of the contacts 33 when they are subsequently fed to the audio amplifier 17. Rather, messages recorded on the magnetic tape are amplified in conventional manner in the audio amplifier 17 and pass into and through the output audio transformer 18. The secondary winding 45 of the output audio transformer 18 is connected to an impedance matching transformer 46 in the matching unit 26. The impedance matching transformer 46 serves to match the output impedance of the output audio transformer 18 to the input impedance of the telephone coupler 14. A pair of diodes 47 are used in the matching unit 26 across the secondary winding 45 of the output audio transformer 18 and the primary winding of the impedance matching transformer 47 to prevent feedback through the matching unit 26 from the telephone coupler 14 into the audio amplifier 17 in a manner which will be understood by those skilled in the art.

OPERATION

From the foregoing description of an embodiment of the invention disclosed herein, it will be understood that the mixer 21 is used with an oscillator 22 and a microphone 16 to provide an input unit 11 which is connected to the recording jack 15 of a conventional tape recorder 10 for recording of one or more programmed series of pulses and of one or more verbal messages. Each programmed series of pulses consists of those pulses and those intervals between pulses which define a telephone number in the same manner as it is defined by a conventional telephone instrument and the last message to be delivered to a telephone is followed by a pulse which is of sufficient duration to provide a disconnect condition on the telephone circuit 13.

In use, the playing control switch 20 is positioned or arranged in a conventional circuit to be operated by the occurrence of an event such as fire or burglary. The operation of the playing control switch 20 causes the energizing of the tape recorder 10 including the audio amplifier 17 and the other conventional components in the tape recorder 10 for playing a magnetic tape.

The energizing of the audio amplifier 17 causes the contacts 33 to open and place a seize condition on the telephone circuit 13. The occurrence of the initial programmed series of pulses on the magnetic tape is delayed to insure that seize condition has caused the seizing in conventional manner of the telephone central office equipment necessary for dialing.

Upon the occurrence of the initial programmed series of pulses the contacts are momentarily closed in a pattern defining the dialing conditions necessary to reach a particular telephone. An interval on the magnetic tape between a programmed series of pulses and the first message to be delivered to a telephone provides time for the telephone to be answered and the sustained pulse on the magnetic tape following the last message to be delivered to a telephone provides the disconnect condition necessary for a similar sequence of pulses and messages to be repeated with respect to another telephone.

It will be understood that regardless of the event which causes the operation of the playing control switch 20, the signal device disclosed herein provides a relatively inexpensive and easy to use signal device for reaching each of a plurality of telephones and delivering one or more messages to each telephone. Further, it will be understood by those skilled in the art that many variations may be made in the embodiments chosen for the purpose of illustrating the present invention without departing from the scope thereof as defined by the appended claims.

We claim:

1. In a signal device for using a telephone circuit to indicate at a telphone the occurrence of an event remote from said telephone, output means responsive to the occurrence of said event and to a programmed series of pulses recorded on a magnetic tape in a tape recorder having an audio amplifier constructed and arranged to be overdriven by each of a plurality of pulses on said magnetic tape, said output means including a pulsing transistor and a thermal resistor, said transistor connected to said telephone circuit for causing the generation of a voltage pulse in said telephone circuit when said transistor is not conducting and said resistor connecting said transistor to said audio amplifier to cause said transistor not to conduct while said amplifier in being overdriven to provide voltage pulses in said telephone circuit corresponding to those voltage pulses from a conventional telephone instrument when said conventional telephone instrument is used to dial said telephone with said telephone circuit.

2. The signal device of claim 1 in which said audio amplifier includes an output audio transformer and in which said output means includes matching means for matching the output impedance of said transformer to the input impedance of said telephone circuit.

3. The signal device of claim 1 in which said output means includes a relay having its contacts in said telephone circuit and which is constructed and arranged to be operative when said audio amplifier is overdriven and said pulsing transistor is not conducting.

4. The signal device of claim 3 in which said audio amplifier is a push-pull amplifier having a first transistor and a second transistor with a common emitter voltage applied through a plurality of resistors, one of which is said thermal resistor, and in which said relay is operatively responsive to changes in voltage across said thermal resistors.

5. The signal device of claim 4 in which said relay is in series with the emitter-collector circuit of said pulsing transistor having a voltage applied at its base proportional to said voltage across said thermal resistors.

6. The signal device of claim 1 including an input means for selectively recording the output of an oscillator and of a microphone on said magnetic tape.

7. The signal device of claim 6 in which said magnetic tape is in a tape recorder having a recording jack and in which said input unit is operatively connected to said recording jack.

8. The signal device of claim 7 in which said input unit includes a switch for selectively interrupting the output of said oscillator between said oscillator and said recording jack.

References Cited

UNITED STATES PATENTS 2,827,515 3/1958 Zuber.

RALPH D. BLAKESLEE, Primary Examiner

U.S. Cl. X.R.

179—6